H. HESS.
BALL BEARING.
APPLICATION FILED APR. 24, 1906.
950,919.
Patented Mar. 1, 1910.
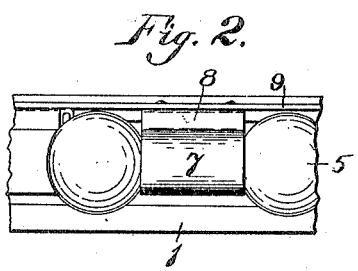
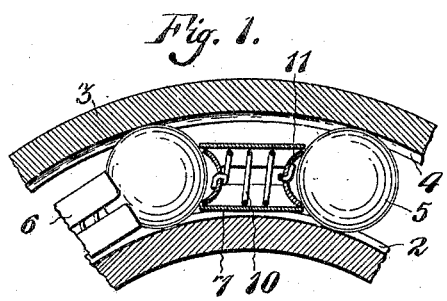
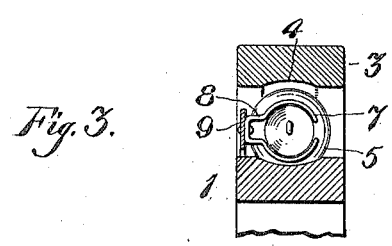
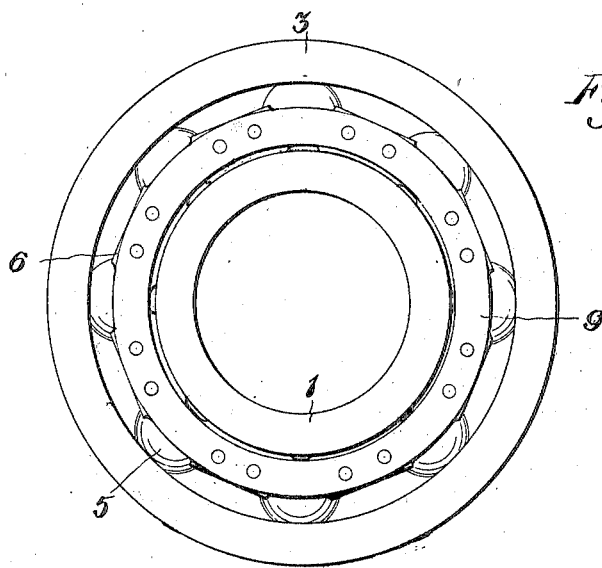
WITNESSES
Lilian Brock
Nancey E. Costello
INVENTOR
Henry Hess,
by Brock Smith
Att'ys.

UNITED STATES PATENT OFFICE.

HENRY HESS, OF PHILADELPHIA, PENNSYLVANIA.

BALL-BEARING.

950,919.

Specification of Letters Patent.  Patented Mar. 1, 1910.

Application filed April 24, 1906.  Serial No. 313,443.

*To all whom it may concern:*

Be it known that I, HENRY HESS, a citizen of the United States, and resident of Philadelphia, in the State of Pennsylvania, have invented certain new and useful Improvements in Ball-Bearings, of which the following is a specification.

My invention relates to ball bearings, and more particularly to separators used in such bearings to space apart the balls.

The novel features and advantages of the said invention are set forth hereinafter in connection with a detailed description, reference being made to the accompanying drawing of an exemplifying structure in which my invention is embodied.

In the drawing, Figure 1 is a transverse sectional view of a segment of a bearing; Fig. 2, a plan view of a segment of a bearing with the outer bearing ring removed; Fig. 3, a longitudinal section on a radial plane; and Fig. 4, an end view.

The bearing proper consists usually of an inner bearing ring 1, an outer bearing ring 3, ball races 2, 4 formed in the rings, and balls 5 in the races. The bearing shown is of the annular, non-adjustable type, but the principal features of my invention are adaptable to a wide range of forms of bearings Between each two adjacent balls is interposed a separator, each of which comprises, in a preferred form of construction, two principal parts—a cage 6, and a distance piece 10. The cage 6 is conveniently formed from sheet metal shaped into generally tubular form, and comprises two wings 7, which in the completed cage are generally somewhat separated at their ends, as seen in Figs. 1 and 3, although this is not essential. It is preferred to construct these cages so that they do not normally actually contact with the balls, but only embrace a segment of a ball at each end, so as to prevent accidental displacement of the cages.

Within each cage is the distance piece or separator proper, 10, consisting in the exemplification shown of a helical coil of spring wire. The ends of the helix may be so shaped as to engage the balls, but usually a cup 11 is provided, directly contacting with each of the adjacent balls, and these cups are connected with the two ends of the wire. The spring is so set that it gently urges the cups against the balls at all times, tending to keep the latter in their proper position, but when any ball tends to run faster or slower than its neighbor, permitting a desirable slight relative movement of the said balls in the direction of their travel around the shaft. At the same time abnormal relative movement of the balls is prevented by the cages, which will be encountered by the balls if they tend to move farther from their correct relative places than is desirable.

The cages serve to retain and support the distance springs. It will be noted that the latter provide a central space, which if desired may be filled with any suitable compressible, absorbent packing, for the purpose of retaining lubricant.

Each of the separators as above described forms an independent unit, and they may be separately placed in the bearing to the required number. In some cases, however, it is desirable to connect all of the separators in a single bearing. This may conveniently be done by providing an extension 8 on each cage, and a connecting ring 9, which preferably lies within the limits of the bearing rings. Each separator cage is then riveted or otherwise secured to the ring, as shown in Figs. 3 and 4. If desired, all the cages in a bearing may be made integral with the ring, and in this case the whole cage structure may be primarily formed by stamping it in a single piece from sheet metal, and thereafter shaping it up by suitable means.

It will be noted that the center line of my separator is in line with the centers of adjacent balls. Because of this arrangement the pressure exerted by the balls passes directly through the center of the separator and there is no tendency for the separator or any of its parts to be sprung out of line. The separators may in this way also be made of minimum length.

Many variations in the structures shown and described, and within the spirit of my invention, may be made, and I contemplate any such alternative construction.

What I claim is:

1. A separator for balls, comprising two cups, each adapted to engage a segment of a ball so that a line passing through the centers of the cups intersects the ball centers, a spring connecting the cups and tending to move them apart, and a cage inclosing the spring, the cups and cage being arranged so that in some cases the ends of the cage may engage the balls.

2. A separator for balls comprising a cage of less diameter than the space between the edges of the race rings of the bearing in which the separator is to be used, two cups each adapted to engage a segment of a ball and of a diameter substantially the same as the inner diameter of the cage and a spring connecting the cups and tending to move them apart.

3. A separator for balls, comprising a sheet metal cage of generally tubular shape interposed between two adjacent balls and at each end embracing a segment of a ball so that it is prevented from accidental displacement, and a spring within the cage, serving to separate said balls.

4. In a ball bearing, a separator, comprising a cage of generally tubular shape and a distance piece within the cage, comprising a helical spring and two cups, one engaging each of two adjacent balls, and both connected with said spring.

5. The combination of two bearing rings having races of curved cross-section, balls in the races and separators intermediate adjacent balls each including a substantially cylindrical cage, a spring within the cage and cups one connected to each end of the spring and engaging a segment of a ball, the cage and cups being constructed and arranged so that the ends of the cage may come in contact with the adjacent balls.

6. The combination of two bearing rings having races of curved cross-section, balls in the races and separators intermediate adjacent balls each including a substantially cylindrical cage split at one side, a spring within the cage and cups, one connected to each end of the spring and engaging a segment of a ball, the cage and cups being constructed and arranged so that the ends of the cage may come in contact with the adjacent balls.

In testimony whereof I have affixed my signature in the presence of two subscribing witnesses.

HENRY HESS.

Witnesses:
THEO. H. M'CALLA,
C. L. M'CALLA.